(12) United States Patent
Vankouwenberg et al.

(10) Patent No.: US 9,846,101 B2
(45) Date of Patent: Dec. 19, 2017

(54) SYSTEM AND METHOD FOR DYNAMIC BALANCING OF A ROTATING BODY

(71) Applicant: Xerox Corporation, Norwalk, CT (US)

(72) Inventors: David A. Vankouwenberg, Avon, NY (US); Robert A. Clark, Williamson, NY (US); Linn C. Hoover, Webster, NY (US); James E. Williams, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 182 days.

(21) Appl. No.: 14/830,849

(22) Filed: Aug. 20, 2015

(65) Prior Publication Data

US 2017/0052085 A1    Feb. 23, 2017

(51) Int. Cl.
  *G01M 1/32* (2006.01)
  *G01M 1/34* (2006.01)
  *G01M 1/24* (2006.01)
  *G01M 1/22* (2006.01)

(52) U.S. Cl.
  CPC .............. *G01M 1/34* (2013.01); *G01M 1/225* (2013.01); *G01M 1/24* (2013.01); *G01M 1/32* (2013.01)

(58) Field of Classification Search
  CPC .......... G01M 1/32; G01M 1/323; G01M 1/326
  See application file for complete search history.

(56) References Cited

U.S. PATENT DOCUMENTS

| 2,937,613 | A | * | 5/1960 | Larsh | G01M 1/30 118/669 |
| 3,968,769 | A | * | 7/1976 | Gusarov | G01M 1/22 118/320 |
| 4,543,463 | A | | 9/1985 | Scuricini | |
| 4,773,019 | A | | 9/1988 | Martin et al. | |
| 5,149,936 | A | | 9/1992 | Walton, II | |
| 2004/0180726 | A1 | * | 9/2004 | Freeman | F16C 3/02 464/180 |
| 2013/0340521 | A1 | | 12/2013 | Clark et al. | |

* cited by examiner

*Primary Examiner* — John Chapman, Jr.
(74) *Attorney, Agent, or Firm* — Maginot, Moore & Beck LLP

(57) ABSTRACT

A system dynamically balances a rotating body. The system includes a support that holds the body as it rotates. At least one sensor generates signals indicative of a balance of the body as it rotates and a controller identifies a position on the body where material can be placed to balance the body. The controller operates at least one actuator to move a plurality of ejectors opposite the identified position where the controller operates at least one ejector in the plurality of ejectors to eject material onto the identified position. The system can operate iteratively until the body is balanced within a predetermined range.

9 Claims, 3 Drawing Sheets

SYSTEM AND METHOD FOR DYNAMIC BALANCING OF A ROTATING BODY

TECHNICAL FIELD

This disclosure relates generally to systems and methods for balancing rotating bodies.

BACKGROUND

Conventional methods for balancing rotating bodies, such as tires and drive shafts, can be time and labor intensive. Under traditional balancing methods, a body is first rotated to determine general areas where an imbalance is located. Then, the rotation is braked until the body no longer rotates, the body is dismounted, and excess material is removed from the body by grinding or drilling, or material, such as a weight, is added to the body. The body is then remounted, again rotated, and the balance is rechecked. This process must be repeated on a trial-and-error basis until the body is balanced.

In other previous methods, the rotating body is rotated to determine general areas where an imbalance is located, and a laser emits a beam that is controlled to subtract a portion of the rotating body and balance the body. In yet other previous methods, a material is deposited on the body and melted to the surface of the body with a laser. Faster and more accurate methods for balancing a rotating body are desirable.

SUMMARY

In embodiments of the disclosure, a system for dynamically balancing a body includes an actuator operatively connected to the body, at least one sensor configured to generate signals indicative of a balance of the body as the actuator rotates the body, a plurality of ejectors configured to eject drops of at least one material, at least one further actuator operatively connected to the plurality of ejectors, the at least one further actuator being configured to move the plurality of ejectors to a plurality of positions opposite the rotating body, and a controller operatively connected to the actuator, the sensor, the plurality of ejectors, and the at least one further actuator. The actuator is configured to rotate the body. The controller is configured to operate the actuator to rotate the body, to identify with reference to the signals from the sensor a position on the body where material ejected onto the body balances the body, to operate the at least one further actuator to move at least one ejector in the plurality of ejectors to the identified position, and to send signals to the at least one ejector to eject material onto the identified position on the body to balance the body.

A method for dynamically balancing a body is also disclosed. In embodiments, the method includes the steps of operating with a controller an actuator to rotate a body about a longitudinal axis of the body, generating with at least one sensor signals indicative of a balance of the body as the body rotates, identifying with the controller a position on the body where material ejected onto the body balances the body, operating with the controller at least one further actuator to move a plurality of ejectors to the identified position, and generating with the controller signals that operate at least one ejector in the ejectors in the plurality of ejectors to eject material onto the identified position on the body to balance the body as the actuator rotates the body.

BRIEF DESCRIPTION OF THE DRAWINGS

The foregoing aspects and other features of systems and methods for balancing rotating bodies are explained in the following description, taken in connection with the accompanying drawings.

DETAILED DESCRIPTION

Figure 1:
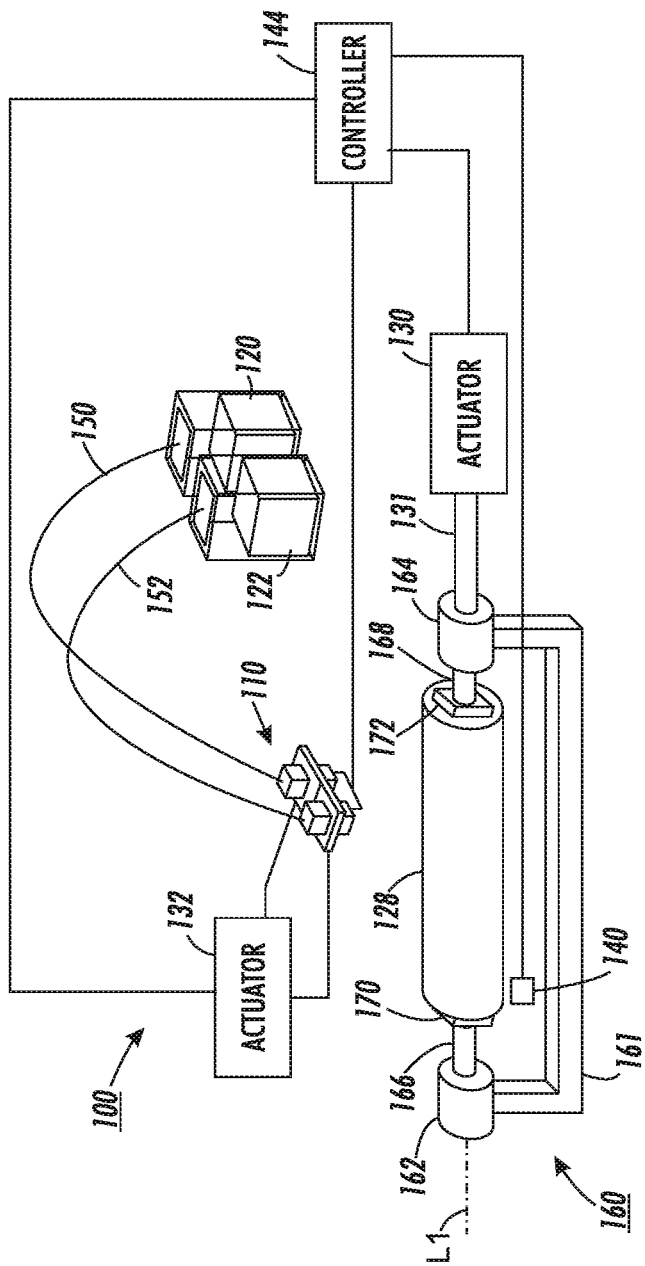
FIG. 1 is a side perspective view of a system including a plurality of ejectors for dynamically balancing a rotating body.

For a general understanding of the present embodiments, reference is made to the drawings. In the drawings, like reference numerals have been used throughout to designate like elements.

FIG. 1 shows a system 100 for dynamically balancing a rotating body 128, such as a tire mounted on a wheel or a drive shaft, including a plurality of ejectors 110, material reservoirs 120, 122, a support member 160 that supports body 128 as it rotates, at least one actuator 130, at least one further actuator 132, a balance sensor 140, and a controller 144. Conduit 150 connects one set of ejectors to material reservoir 120, and conduit 152 connects another set of ejectors 110 to material reservoir 122. The at least one actuator 130 is operatively connected to the support member 160 and the at least one further actuator 132 is operatively connected to the plurality of ejectors 110.

Controller 144 is operatively connected to actuators 130, 132, plurality of ejectors 110, and balance sensor 140. Controller 144 is, for example, a self-contained, dedicated computer having a central processor unit (CPU) with electronic storage, and a display or user interface (UI). Controller 144 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

Support member 160 is configured to support body 128 as it rotates. In the embodiment shown in FIG. 1, support member 160 includes, at one end, a bearing 162 rotationally supporting a shaft 166 that is fixedly connected to a fastener 170 and, at an opposite end, a bearing 164 rotationally supporting a shaft 168 that is fixedly secured to a fastener 172. Support member 160 further includes a base 161 that fixedly supports bearings 162, 164. Fasteners 170, 172 may comprise any preferred type, size and number of fasteners configured to secure a rotating body. In one embodiment, fasteners 170, 172 comprise clamping elements that clamp either end of a drive shaft. In another embodiment, only a single fastening element is used. For example, in an embodiment where the rotating body 128 is a tire mounted to a wheel, a single fastening element is used which comprises bolts and lug nuts (not shown) that correspond to openings provided in the wheel (not shown), as is well known. However, any type and number of fasteners may be implemented to secure the rotating body to be balanced. Moreover, while support member 160 in the embodiment described includes bearings, shafts, and fasteners, in other embodiments support member 160 comprises any element necessary to rotationally secure body 128 to the at least one actuator 130.

The at least one actuator 130 comprises one and possibly more actuators, and is configured to rotate body 128. In the embodiment shown, actuator 130 includes a drive shaft 131 coupled to shaft 168 of support member 160. Controller 144 operates actuator 130 to rotate drive shaft 131 in order to rotate fasteners 170, 172 and shafts 166, 168 together with body 128 about a longitudinal axis L1 of body 128 about bearings 162, 164 during a balancing operation.

Figure 2:
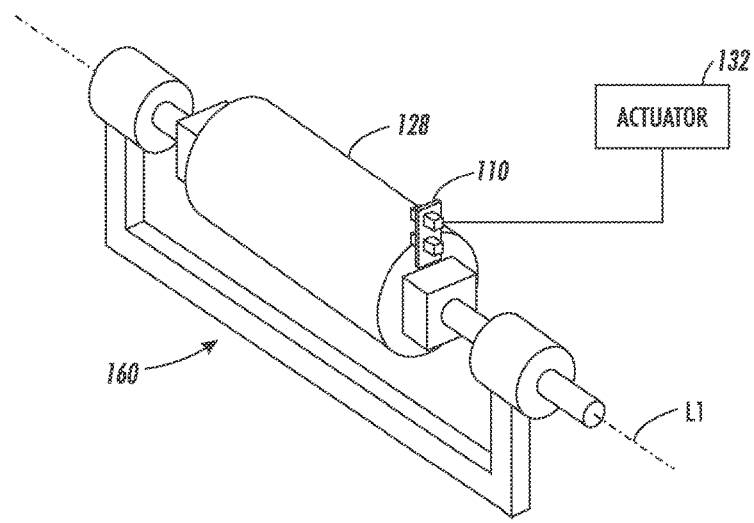
FIG. 2 is a side perspective view of the system of FIG. 1 depicting the plurality of ejectors positioned with respect to an axial end face of the rotating body.

Controller 144 also operates the at least one further actuator 132 to move the plurality of ejectors 110 with respect to body 128 to enable the plurality of ejectors 110 to eject material onto positions along the surface of body 128. That is, one or more actuators can be operatively connected to structure supporting the ejectors 110 to move the ejectors in a process direction and a cross-process direction with reference to the surface of the rotating object 128. In FIG. 1, two ejectors are provided in the plurality of ejectors 110. These ejectors can be adjoined in a single structure so the two ejectors can move in tandem. Alternatively, the two ejectors can be separated so they can be moved independently of one another. Thus, the plurality of ejectors 110 can be moved as a single unit in some embodiments and, in other embodiments, ejectors can be moved independently of one another or independently as groups. In some of these embodiments, each ejector in the plurality of ejectors 110 is composed of a single ejector, as depicted in FIG. 1, while in other embodiments, each ejector in the plurality of ejectors 110 can be configured as a printhead having multiple ejectors. As shown in FIG. 2, actuator 132 according to some embodiments is configured to move the ejectors in the plurality of ejectors 110 to desired positions with respect to an axial end face of body 128. Moreover, in some particular embodiments, the plurality of ejectors 110 is moved with respect to body 128 along a rail (not shown), while in other particular embodiments, a robotic arm (not shown) moves the plurality of ejectors 110 to desired positions with respect to body 128. The at least one further actuator 132 may comprise any type and number of actuators to move the plurality of ejectors 110 to positions that enable material to be ejected to at desired locations of body 128.

With reference to FIG. 1, controller 144 is further configured to send firing signals to the ejectors in the plurality of ejectors 110 to selectively control one or more of the ejectors in the plurality of ejectors to eject drops of material to the surface of the body 128 at desired locations in a manner described more fully below. The plurality of ejectors 110 is configured to eject desired quantities of material accurately to precise locations. For example, in some embodiments, ejectors are configured to eject as little as a single drop of material having a mass of as little as nine nanograms. In some embodiments, the sizes of the drops ejected by the ejectors range from a single picoliter of material to 100 picoliters or more.

Balance sensor 140 comprises one or more sensors configured to generate signals indicative of the balance of the body 128 as the body 128 is rotated and send these signals to the controller 144. For example, the balance sensors may comprise one or more vibration sensors, such as accelerometers, configured to generate signals corresponding to vibrations or oscillations of the body 128 at a single or plurality of longitudinal positions along the body 128 during rotation. The vibrations correspond to one or more eccentricities of the mass of the body 128 indicative of the balance of the body. The balance sensor 140 may further comprise, or alternatively be configured as, a topography sensor configured to monitor the surface of the body 128. One type of topography sensor includes a laser that directs electromagnetic radiation along a balancing plane of the body 128 and detects radiation reflected from the surface of the body, which is indicative of the contouring and thus the balance of the body. Any balance sensor or sensors configured to generate signals indicative of the balance of rotating body 128 may be utilized.

In operation of system 100, a body 128 to be balanced, such as a tire or a drive shaft, is secured to support element 160 by known fasteners 170, 172 with the longitudinal axis L1 of the body 128 being aligned with an axis of rotation of drive shaft 131 of the at least one actuator 130. Controller 144 operates actuator 130 to rotate body 128 about the longitudinal axis L1. Balance sensor 140 detects, for example, vibrations indicative of the balance of the body and generates signals indicative of the balance of body 128. Controller 144 receives the signals generated by balance sensor 140 and identifies with reference to these signals at least one position where material ejected from one or more of the ejectors in the plurality of ejectors 110 balances rotating body 128. The positions may be, for example, along a circumferential surface of body 128 as shown in FIG. 1, an axial end surface of the body 128 as shown in FIG. 2, or any position in which material may be ejected to balance body 128. With reference to FIG. 1, controller 144 operates the at least one further actuator 132 to move at least one ejector in the plurality of ejectors 110 to the at least one position that enables the at least one ejector to eject material to a surface of the body at a location that balances the body, and sends firing signals to the at least one ejector in the plurality of ejectors 110 to eject material towards the surface of body 128. The at least one position can be a single position, or a plurality of positions. The at least one position can be along a longitudinal axis, as shown in FIG. 1, at the axial end surface as shown in FIG. 2, or any other position with respect to body 128 to balance body 128. In some embodiments, controller 144 operates actuator 132 and the ejectors in the plurality of ejectors 110 so the plurality of ejectors 110 make multiple passes while ejecting material at a single or multiple locations to build up material necessary to balance rotating body 128. In some embodiments, ejectors in the plurality of ejectors 110 are moved together or independently to positions where firing signals are sent to the ejectors to eject material at the appropriate position.

In certain embodiments, controller 144 is configured to identify from the signals received from the balance sensors an appropriate amount of material to eject in addition to the location or locations to eject material onto the surface of body 128 to balance the body. After ejection, controller 144 again monitors signals from balance sensors 140 to determine whether the body is balanced to a requisite balance threshold. The process of determining whether the body is balanced or whether additional material should be ejected is repeated until the threshold is achieved. In other embodiments, controller 144 continually monitors the balance of body 128 as the body is rotated from balance signals generated by balance sensors 140 during and after ejection of material. In this manner, the amount of material ejected and the location required for any material ejection may be continually updated based on the signals from balance sensors 140 until a requisite balance is achieved.

After body 128 is balanced, controller 144 operates actuator 130 to stop rotating the body 128 so it may be removed, and another body mounted for balancing. System 100 therefore provides an automated method for balancing a body in which the body is continually rotated while balance is determined with the controller and balance sensors, and while material is ejected to the surface of the body. However, in other embodiments, controller 144 operates actuator 130 to stop rotating after balance is determined in order to eject material with plurality of ejectors 110 while body 128 is not rotating, or rotating at a lower rate of rotation. In such embodiments, controller 144 operates actuator 130 to rotate again and determines balance of body 128 with signals from balance sensor 140 after material has been ejected. This process may be repeated until sufficient balance is achieved. In any embodiment, after a user secures the body to the support member 160 and initiates system operation, the system is configured to balance the body without further user intervention.

Furthermore, while two material reservoirs 120, 122 are depicted for system 100, any number of material reservoirs may be used. Each reservoir may contain the same, or a different material depending on the type of body or bodies to be balanced by the system. Any desired material may be utilized to facilitate balancing of the rotating body. In one embodiment, reservoir 120 may contain material having a lower density than the material in reservoir 122. In another embodiment, reservoir 120 may contain a material suitable for balancing a first type of body, such as a tire, while reservoir 122 may contain a material suitable for balancing a second type of body, such as a drive shaft.

Figure 3:
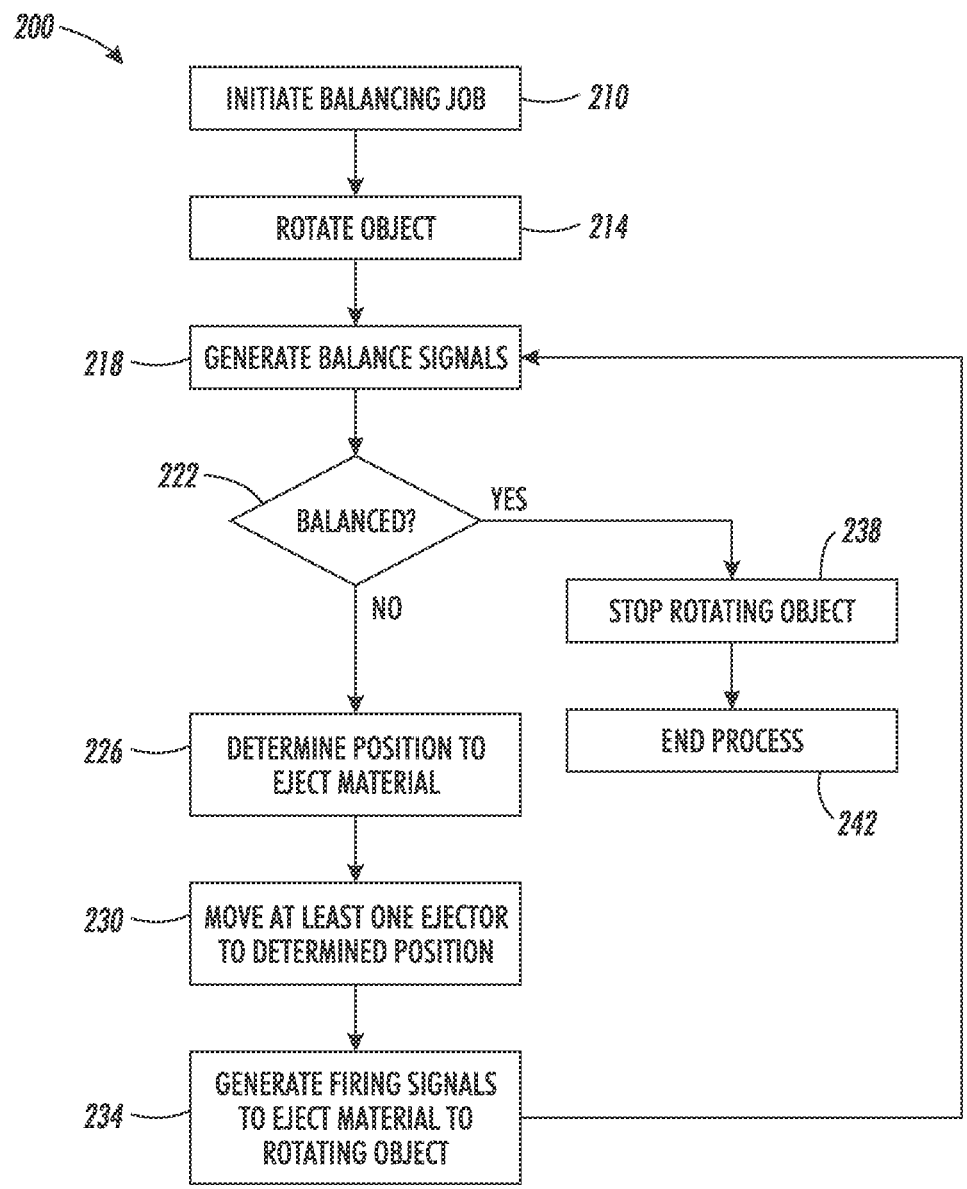
FIG. 3 is a flow diagram of a process for operating the inkjet printer of FIGS. 1-2.

A process for operating a system for dynamically balancing a rotating body, such as system 100 of FIG. 1, is shown in FIG. 3. In the following description of these processes, statements that a process is performing some task or function refers to a controller or general purpose processor executing programmed instructions stored in a memory operatively connected to the controller or processor to manipulate data or to operate one or more components in the printer to perform the task or function. The controller 144 noted above can be such a controller or processor. Alternatively, controller 144 can be implemented with more than one processor and associated circuitry and components, each of which is configured to form one or more tasks or functions described herein.

According to process 200 of FIG. 3, upon initiation of a balancing job (block 210), process 200 rotates a body to be balanced with at least one actuator (block 214). With the body rotating, process 200 generates signals with a balance sensor indicative of the balance of the body (block 218). Based on the signals from the balance sensor, process 200 then determines whether the body is balanced (block 222). If the body is balanced, process 200 controls the at least one actuator to stop rotating the body (block 238) and the process ends (block 242). If the body is not balanced, process 200 determines at least one position to eject material from at least one of the ejectors in the plurality of ejectors to balance the body (block 226), operates at least one further actuator to move at least one of the ejectors in the plurality of ejectors to eject material at the at least one position (block 230), and generates firing signals to the at least one ejector in the plurality of ejectors to eject material onto the surface of the body at the at least one position (block 234). Process 200 iteratively performs the processing identified in blocks 218, 222, 226, 230, 234 until the body is balanced to a requisite balance threshold. The process then controls the one or more first actuators to stop rotating the body (block 238) and the process ends (block 242).

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A system for dynamically balancing a body comprising:
   an actuator operatively connected to the body, the actuator being configured to rotate the body;
   at least one sensor configured to generate signals indicative of a balance of the body as the actuator rotates the body;
   a plurality of ejectors configured to eject drops of at least one material;
   at least one further actuator operatively connected to the plurality of ejectors, the at least one further actuator being configured to move the plurality of ejectors to a plurality of positions on a circumference of the rotating body and to positions that enable at least one ejector in the plurality of ejectors to eject material onto an axial end face of the rotating body; and
   a controller operatively connected to the actuator, the sensor, the plurality of ejectors, and the at least one further actuator, the controller being configured to operate the actuator to rotate the body, to identify with reference to the signals from the sensor a position on the body where material ejected onto the body balances the body, to operate the at least one further actuator to move at least one ejector in the plurality of ejectors to the identified position, and to send signals to the at least one ejector to eject material onto the identified position on the body to balance the body.

2. The system of claim 1, the at least one further actuator being further configured to:
   move at least one ejector in the plurality of ejectors independently of at least one other ejector in the plurality of ejectors.

3. The system of claim 1, the plurality of ejectors further comprising:
   at least one printhead.

4. The system of claim 3, the plurality of ejectors further comprising:
   at least one other printhead, the at least one printhead and the at least on other printhead being configured for independent movement with respect to one another.

5. The system of claim 1, the at least one sensor being a plurality of sensors configured to detect vibrations of the body as the actuator rotates the body.

6. A method for dynamically balancing a body comprising:
   operating with a controller an actuator to rotate a body about a longitudinal axis of the body;
   generating with at least one sensor signals indicative of a balance of the body as the body rotates;
   identifying with the controller a position on a circumference of the body or on an axial end face of the body where material ejected onto the body balances the body, the controller being configured to identify the position with reference to the signals generated by the sensor;

operating with the controller at least one further actuator to move a plurality of ejectors to the identified position; and generating with the controller signals that operate at least one ejector in the ejectors in the plurality of ejectors to eject material onto the identified position on the body to balance the body as the actuator rotates the body.

7. The method of claim 6 further comprising:

operating with the controller the at least one further actuator to move at least one printhead in the plurality of ejectors to the identified position; and generating with the controller signals that operate the at least one printhead to eject material onto the identified position on the body to balance the body as the actuator rotates the body.

8. The method of claim 6 further comprising:

operating with the controller the at least one further actuator to move at least two printheads in the plurality of ejectors independently of one another.

9. The method of claim 6, the generation of the signals indicative of the balance of the rotating body further comprising:

generating the signals with a plurality of vibration sensors that detect vibrations of the body as the actuator rotates the body.

* * * * *